United States Patent
Farzan et al.

(10) Patent No.: US 11,394,591 B2
(45) Date of Patent: *Jul. 19, 2022

(54) EDGE ENHANCEMENT FOR SIGNAL TRANSMITTER

(71) Applicant: Rambus Inc., San Jose, CA (US)

(72) Inventors: Kamran Farzan, Toronto (CA); Dongyun Lee, Sunnyvale, CA (US)

(73) Assignee: Rambus Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/247,932

(22) Filed: Dec. 30, 2020

(65) Prior Publication Data

US 2021/0203530 A1 Jul. 1, 2021

Related U.S. Application Data

(63) Continuation of application No. 16/817,171, filed on Mar. 12, 2020, now Pat. No. 10,877,137.

(60) Provisional application No. 62/819,331, filed on Mar. 15, 2019.

(51) Int. Cl.
*H04L 27/04* (2006.01)
*H04L 27/08* (2006.01)

(52) U.S. Cl.
CPC ............ *H04L 27/04* (2013.01); *H04L 27/08* (2013.01)

(58) Field of Classification Search
CPC ..... H04L 25/4917; H04L 27/04; H04L 27/08; H04L 2025/0336; H04B 14/023
See application file for complete search history.

(56) References Cited

U.S. PATENT DOCUMENTS

| | | |
|---|---|---|
| 7,269,212 B1 | 9/2007 | Chau et al. |
| 8,878,568 B1 | 11/2014 | Farzan et al. |
| 10,887,137 B2 * | 1/2021 | Farzan .................... H04L 27/04 |

(Continued)

FOREIGN PATENT DOCUMENTS

WO   WO 2017-058357   4/2017

OTHER PUBLICATIONS

Wong, Koon-Lun Jackie et al., "A Serial-Link Transceiver with Transition Equalization", IEEE International Solid-State Circuits Conference, Digest of Technical Papers, pp. 223-232, Feb. 6-9, 2006. 10 pages.

*Primary Examiner* — Rahel Guarino
(74) *Attorney, Agent, or Firm* — Lowenstein Sandler LLP

(57) ABSTRACT

A signal transmitter circuit includes an output driver circuit configured to transmit a signal using a multi-level pulse amplitude modulation (PAM) scheme comprising a plurality of discreet signal levels. During operation, the output driver initiates a first transition of the signal to a first level of the multi-level PAM scheme from a second level of the multi-level PAM scheme, and initiates a second transition of the signal to the first level from a third level of the multi-level PAM scheme. The signal transmitter further includes a control circuit configured to control a slew rate of the signal transmitter circuit to cause the signal to reach a threshold voltage level at a first time, the first time occurring a first duration of time after the first transition is initiated, and to cause the signal to reach the threshold voltage level at a second time, the second time occurring the first duration of time after the second transition is initiated.

20 Claims, 7 Drawing Sheets

(56) References Cited

U.S. PATENT DOCUMENTS

2018/0248577 A1 8/2018 Hossain et al.
2018/0278440 A1 9/2018 Dong

* cited by examiner

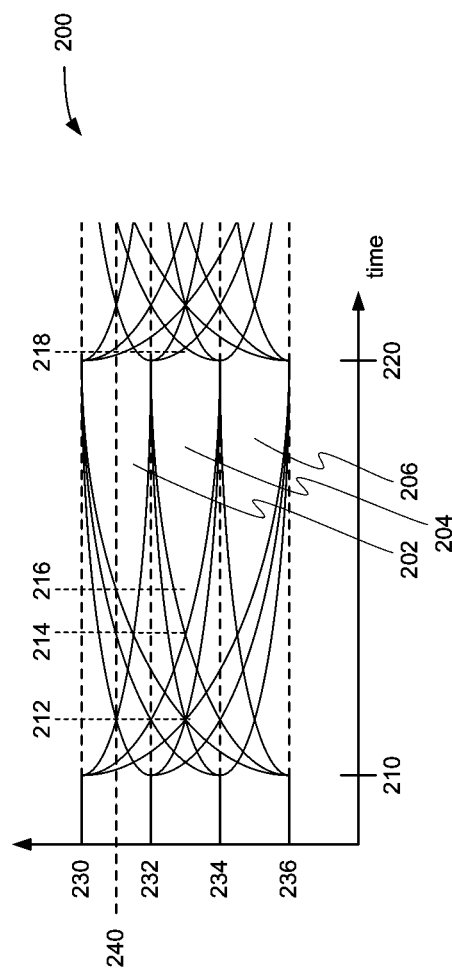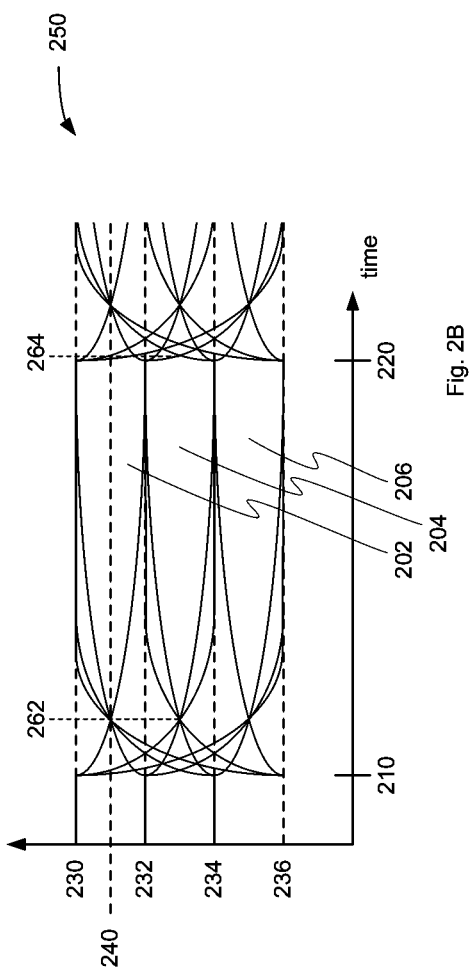

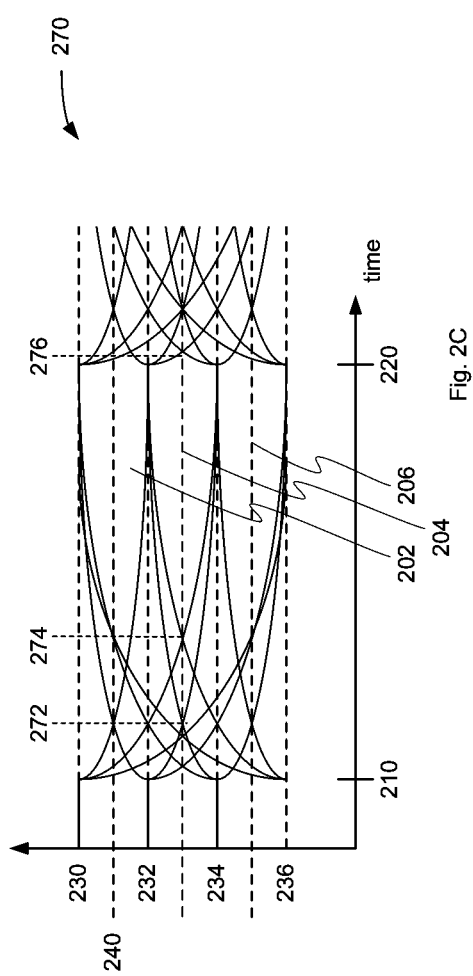

EDGE ENHANCEMENT FOR SIGNAL TRANSMITTER

RELATED APPLICATIONS

This application is a continuation of U.S. patent application Ser. No. 16/817,171, filed Mar. 12, 2020, now U.S. Pat. No. 10,887,137, issued Jan. 5, 2021, which claims the benefit of U.S. Provisional Application No. 62/819,331, filed Mar. 15, 2019, then entire contents of which are hereby incorporated by reference herein.

BACKGROUND

High-speed interconnect links have been widely used in high-speed network switching, local area networks, memory buses and multi-processor interconnection networks. Many high-speed digital signals are transmitted between analog and/or digital chips. High-speed inter-chip links can significantly reduce the total number of signal traces between chips in a system. In such applications, overall system performance decreases as the communication speed between chips in the system increases. For a given data rate, multi-level signaling can be used to reduce the channel symbol rate. Multi-level signaling also lowers the required maximum on-chip clock frequency, intersymbol interference (ISI), and crosstalk.

BRIEF DESCRIPTION OF THE DRAWINGS

The present disclosure is illustrated by way of example, and not by way of limitation, in the figures of the accompanying drawings.

FIGS. 2A-2C are "eye" diagrams of a 4-PAM signaling system, according to an embodiment.

DETAILED DESCRIPTION

Figure 1:
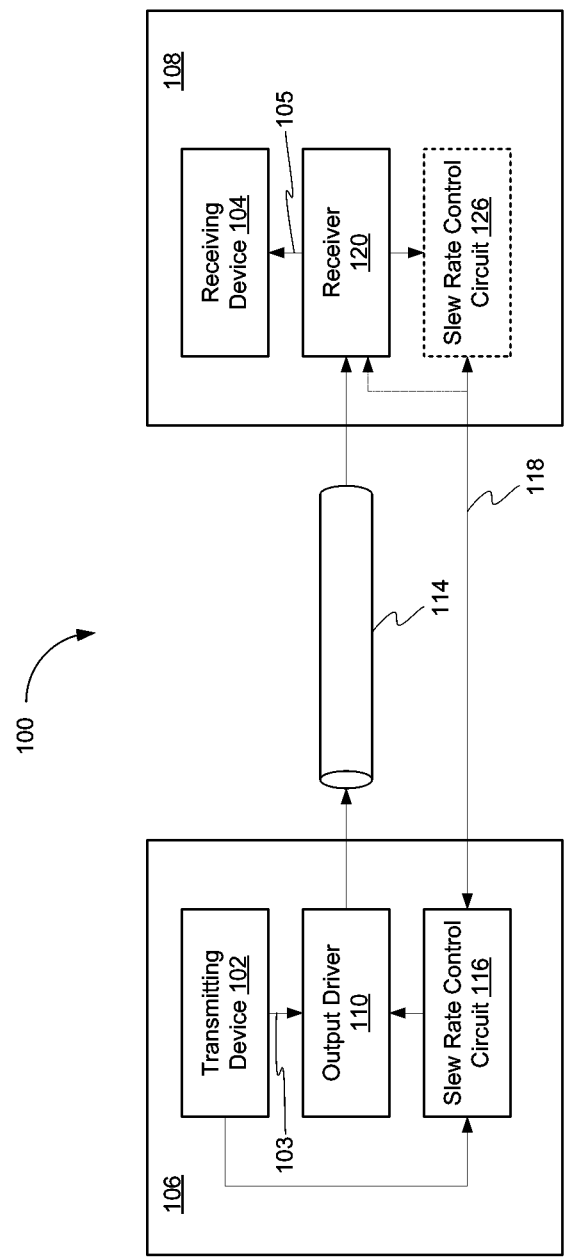
FIG. 1 is a block diagram illustrating a signaling system with edge enhancement for the signal transmitter, according to an embodiment.

The following description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

The increasing demand for data bandwidth in computing systems, memory devices, etc., has driven high-speed serial link standards to move to multi-level pulse amplitude modulation (PAM) signaling. Multi-level PAM signaling schemes are specified in part by the number of voltage levels used to represent symbols. For example, a "4-PAM" system uses 4 levels; a "6-PAM" system uses 6 levels, etc. One of the main challenges in multi-level PAM signaling is that transitions from different levels take different amounts of time due to the driver slew rate. For example, a transition from the lowest voltage level (referred to herein as "−3" in a 4-PAM system) to the highest voltage level (referred to herein as "+3" in a 4-PAM system) may take considerably longer than a transition from an intermediated level (referred to herein as "−1" or "+1" in a 4-PAM system) to the highest voltage level. This is evident when an "eye" diagram of the signal is generated illustrating that the signal transitions cross the threshold of each eye (referred to herein as the zero crossing) at different times causing a horizontal eye closure (i.e., a reduced timing margin). Since the amount of eye closure is a function of the driver slew rate at the output, it may be desirable to use the edge enhancement techniques described herein to increase the eye width.

For a driver with a fixed output impedance and capacitive load, the slew rate is fixed and does not vary as the data rate increases or decreases. Accordingly, when the data rate increases, the relative eye closure per unit interval due to slew rate gets worse. To alleviate this problem, edge enhancement can be used to increase the slew rate, thereby reducing the rise and fall times of the multi-level signal. Enhancements to the edges of the transmitter output signal can require various tradeoffs, including increased power usage and circuit complexity, and may not consider the optimum amount of edge enhancement for each individual signal transition.

Aspects of the present disclosure can address the above and other considerations by, in some implementations, adjusting one or more parameters that impact the slew rate of the signal transmitter only during certain transitions from one voltage level to another and only by a designated amount. For example, the transmitter may include a slew rate control circuit configured to opportunistically adjust the output impedance of the signal transmitter or to inject a specific amount of current into the signal during the relevant transition periods. The desired output impedance and/or amount of current is determined in order to maximize, or at least improve, the eye width (e.g., timing margin) of a 4-PAM transmitter output by using different slew rates for different transitions. By adjusting the parameters only during certain transitions, the output swing and return loss will not be significantly affected. In addition, the proposed edge-enhancement circuitry can be modified so that it can be used for swing enhancement and fine transmit equalization (TxEQ) without losing the swing. This allows the transmitter to be configured for any combination of swing-enhancement, TxEQ-enhancement, and edge-enhancement to achieve the best performance. Additional details of edge enhancement for a signal transmitter are provided below with respect to FIGS. 1-6.

FIG. 1 is a block diagram illustrating a data transmission system 100 with edge enhancement for the signal transmitter, according to an embodiment. Transmitting device 102, which could be any kind of digital or analog processing system, provides signals 103 to output driver 110. Signals 103 typically include data to be transmitted. In some embodiments, a system clock ("SysClk") may also be provided from transmitting device 102 to output driver 110. In other embodiments, transmitting device 102 and output driver 110 receive a system clock SysClk from external clock circuitry (not depicted). Output driver 110 drives one or more symbols onto channel 114. Channel 114 can be any one of a number of types of links, including, but not limited to, coaxial cable, a trace or series of traces (e.g., metallic traces) on a printed circuit board, a set of twisted pair wires, a complicated signal path from a daughtercard onto a motherboard and back to another daughtercard, a path through which microwave or radio frequency signals propagate, or any one of a number of other physical environments over which data transmission is to be achieved. Typically, transmitting device 102 and output driver 110 are embodied on a single printed circuit board 106 (e.g., embodying a signal transmitter circuit). In some embodiments, transmitting device 102 and output driver 110 may be embodied on the same integrated circuit.

The symbols propagate on channel 114, and are received by receiver 120. Receiver 120 decodes the symbols and provides resulting signals 105 to receiving device 104. Typically, signals 105 include data decoded from the symbols. Additionally, signals 105 may also contain a receiver clock ("RxClk"). Some embodiments include, as part of channel 114, a dedicated line for symbols representing the receiver clock RxClk. The receiver clock, in other embodiments, is received directly as part of the symbols. In some embodiments, the receiver clock, RxClk, is derived from the symbols by receiver 120. In these embodiments, receiver 120 typically includes clock recovery circuitry. Receiving device 104 could be any kind of analog or digital processing unit. In some embodiments, as shown in FIG. 1, receiving device 104 and receiver 120 are embodied on a single printed circuit board 108. In other embodiments, receiving device 104 and receiver 120 are embodied on a single integrated circuit.

In one embodiment, the operation of output driver 110 is influenced by slew rate control circuit 116. For example, the rate of output of the one or more symbols and the modulation scheme by which the symbols encode data in signals 103 may vary depending on the state of one or more mode signals provided to output driver 110 by slew rate control circuit 116. In one embodiment, slew rate control circuit 116 may reside on printed circuit board 106 (e.g., as part of the signal transmitter circuit). In other embodiments, however, slew rate control circuit 116 may reside elsewhere, such as on printed circuit board 108, partially on printed circuit board 106 and partially on printed circuit board 108, or on neither printed circuit board 106 nor printed circuit board 108. Depending on the embodiment, slew rate control circuit 116 may optionally influence the operation of receiver 120. For example, receiver 120 may contain a plurality of subcircuits configured to decode symbols modulated by various modulation schemes. Slew rate control circuit 116, in some embodiments, provides one or more mode signals to receiver 120 over signal line 118, allowing receiver 120 to disable any subcircuits not needed to decode symbols in the present modulation scheme, saving power. In some embodiments, slew rate control circuit 116 determines a state of one or more mode signals, at least in part, based on information provided by receiver 120. Receiver 120 provides information about the received symbols to slew rate control circuit 116 over bi-directional signal line 118. In some embodiments, the information provided refers to various aspects of the timing of received symbols including, but not limited to, jitter, rise time, fall time, overshoot, and undershoot, or a subset of these. Depending on the embodiment, signal line 118 may be a separate signal line or may be part of channel 114. In one embodiment, a second implementation of the slew rate control circuit (i.e., slew rate control circuit 126) may be present on printed circuit board 108. Slew rate control circuit 126 may be either the same as slew rate control circuit 116 or may include different circuitry and/or logic. In this embodiment, slew rate control circuit 126 may receive information from receiver 120 and may provide said information to slew rate control circuit 116 over signal line 118. Depending on the embodiment, the information provided by receiver 120 may include, for example, signal parameters including the level of slew rate, output impedance, or injected current, and/or crossing point information indicating where the signal transmitted on channel 114 crosses a threshold voltage when transitioning from one voltage level to another. For example, receiver 120 may indicate through the provided information whether an increase or decrease in transmit equalization (TXEQ) for the transmitted signal would be preferred. Slew rate control circuit 116 may use the information provided by receiver 120 (optionally provided through slew rate control circuit 126) to adjust the slew rate of the transmitted signal, as described herein. As another example, slew rate control circuit 116 may direct output driver 110 to drive a predetermined test sequence of data as symbols onto channel 114. Receiver 120 then decodes the symbols which, when received, have undergone various types of distortion imparted by channel 114. Receiver 120 then may provide the decoded data to slew rate control circuit 116. Based on differences between the test data and received data, slew rate control circuit 116 may then change the state of a mode signal to achieve lower error-rate transmission through channel 114. In some embodiments, slew rate control circuit 116 selects a pulse amplitude modulation (PAM) scheme in this way.

In one embodiment, output driver 110 transmits a signal over channel 114 using a multi-level PAM scheme comprising a plurality of discreet signal levels. PAM is one of a number of digital modulation schemes (others including pulse duration modulation (PDM) and pulse position modulation (PPM)) used to transmit analog and/or digital data over a channel. A multi-level version of this modulation scheme provides a means of increasing the amount of data that may be transmitted without increasing the frequency of transmitted symbols. Hereinafter, a PAM modulation scheme in which a symbol may assume any one of N levels will be referred to as N-PAM. Thus, in a 4-PAM modulation scheme, a symbol may assume any one of four levels. For example, relative to a maximum reference voltage Vref, data could be gray coded in a 4-PAM scheme. In an exemplary gray coded 4-PAM modulation scheme, the symbol representing the bit-pair (00) has an ideal voltage level of 0, the symbol representing the bit-pair (01) has an ideal voltage level of Vref/3, the symbol representing the bit-pair (11) has an ideal voltage level of 2*Vref/3, and the symbol representing the bit-pair (10) has an ideal voltage level of Vref. In some embodiments, symbols are encoded and driven as various currents on a pair of conductors in the transmission channel (differential current-mode signaling). In other embodiments, the symbols are driven as currents on one or more conductors (single-ended or differential current-mode signaling). In still other embodiments, the symbols are driven as voltage levels on one or more conductors.

Traditional 2-PAM modulation schemes drive symbols that assume one of only two distinct levels. Each symbol in a 4-PAM serial link carries twice as much data as each symbol in a 2-PAM scheme. For a fixed maximum signal level, 2-PAM has traditionally yielded optimal data transfer rates, as larger noise margins exist amongst possible symbol levels. The larger noise margins, in turn, permit higher levels of noise to corrupt the signal before ambiguity exists in decoding the symbol.

As system designers move to serial link technologies operating above 1 Gbps, however, multi-level signaling schemes offer a convenient means of either increasing data transmission rates while sending symbols at a fixed symbol rate or maintaining a given data transmission rate while sending symbols at a lower symbol rate. This flexibility allows minimization of bit-error rates (i.e., the probability with which the receiver incorrectly decodes a symbol). At higher data and symbol rates, various sources of signal degradation complicate the choice of the optimal number of levels for PAM modulation. As with the other problems, the higher the frequency, in general, the greater the signal loss.

When using the multi-level PAM scheme (e.g., 4-PAM), output driver 110 varies the voltage level of the signal depending on what value is being transmitted. Accordingly, output driver 110 initiates transitions of the signal from one level to another according to the value. For ease of explanation herein, in a 4-PAM scheme, the lowest signal level may be referred to as "−3," the next signal level may be referred to as "1," the third signal level may be referred to as "+1," and the highest signal level may be referred to as "+3." The transition from any one of these signal levels to another may have a corresponding transition time. Thus, the transition from −3 to +3, for example, may take a longer period of time than the transition from +1 to +3. In one embodiment, slew rate control circuit 116 can adjust one or more parameters of the signal transmitter circuit that impact the transition time only during certain transitions from one voltage level to another and only by a designated amount. For example, slew rate control circuit 116 may adjust the output impedance of the output driver 110 or may inject a specific amount of current into the signal during the relevant transition periods. The desired output impedance and/or amount of current is determined in order to increase the eye width (e.g., timing margin) of the signal output by using different slew rates for different transitions. Either so-called edge enhancement technique is designed to cause the signal to reach a designated threshold voltage level (sometimes referred to herein as the "zero crossing") at a certain period of time after the transition is initiated, regardless of which levels the signal transition is occurring between. Additional details regarding the operation of slew rate control circuit 116 are provided below.

The data transmission system 100 depicted in FIG. 1 represents only one of many typical systems in which high data-rate signaling over a complex communications channel 114 is possible. For example, in other data transmission systems, channel 114 is bidirectional, capable of propagating symbols in both directions along its length. In some of these systems, devices on opposite ends of the channel (e.g. printed circuit board 106 and printed circuit board 108) each send and receive symbols to the other. These systems may exploit the bidirectionality of the channel 114 by simultaneously propagating symbols in both directions on channel 114. In other systems, symbols travel only in one direction at any given time on channel 114. In some embodiments, printed circuit board 106 and printed circuit board 108 each include an output driver 110 and a receiver 120. In these embodiments, channel 114 may comprise one or more unidirectional channels, one or more bidirectional channels, or some combination thereof.

FIGS. 2A and 2B are eye diagrams of a 4-PAM signaling system, according to an embodiment. A multi-level PAM signal, such as a 4-PAM signal may be characterized by its eye diagram, such as eye diagrams 200 and 250. The eye diagrams represent the ranges of transmission voltages and signal transmission times for a signal when data transmission is successful. An eye diagram, in essence, is an overlay of the time history of a plurality of received symbols in a data transmission system, such as data transmission system 100. After determining the "eye" for each transition of the signal, the corresponding eye patterns are overlaid to generate the overall device performance characteristics. The height and width of the "eye" 202, 204, or 206 serves as a figure of merit for the transmission system, as these determine the level of complexity required to unambiguously decode the symbols. The width of each "eye" represents the range of signal transition times, which still results in successful data transmission. The height of each "eye" represents the amount of voltage error and noise that the system can tolerate. In general, the larger the "eye," the better the device characteristics. A larger "eye" means larger timing and voltage margins and increased tolerance to noise and timing skew.

In the 4-PAM system depicted by the eye diagram 200 of FIG. 2A, the symbol width is defined by the interval between time 210 and time 220. Symbols in a 4-PAM system have one of four levels: 230, 232, 234, or 236. The widths of eyes 202, 204, and 206 are each less than the symbol width due to a variety of effects including, but not limited to, slew rate, timing jitter, intersymbol interference (ISI), and dispersion in the transmission channel. The heights of eyes 202, 204, and 206 are all less than the magnitude difference between signal levels due to a number of effects, many of which are related to losses in a band limited transmission channel.

In one embodiment, the eye width (also referred to herein as the "horizontal eye opening") is measured at a threshold voltage or "zero crossing." In one embodiment, the threshold voltage may be positioned at the midpoint between any two voltage levels. For example, the threshold voltage 240 is located at the midpoint between signal levels 230 and 232. As illustrated in eye diagram 200, the signal transitions from signal levels 232, 234, and 236 to signal level 230 all reach the threshold voltage 240 at different points in time. For example, the transition from signal level 232 to signal level 230 reaches the threshold voltage 240 at time 212, the transition from signal level 234 to signal level 230 reaches the threshold voltage 240 at time 214, and the transition from signal level 236 to signal level 230 reaches the threshold voltage 240 at time 216. Since time 216 is the latest, the transition from signal level 236 to signal level 230 defines the leftmost boundary of eye 202. The rightmost boundary of eye 202 is defined by the transition from signal level 230 to signal level 236 which crosses threshold voltage 240 at time 218. Thus, the width of eye 202 spans from time 216 to time 218. As can be seen, the width of eye 202 is considerably less than the symbol width (defined by the interval between time 210 and time 220.)

In one embodiment, when the edge enhancement techniques described herein are implemented, such as by slew rate control circuit 116, the width of the eyes 202, 204, and 206 can be increased, as shown in eye diagram 250 of FIG. 2B. For example, slew rate control circuit 116 can control at least one parameter of the signal transmitter circuit, such as an output impedance of the output driver 110 or an amount of current injected into the signal, to adjust the slew rate during the transition. Adjusting the slew rate during the transition can cause the signal to reach a threshold voltage, such as threshold voltage 240, at a first time after the transition is initiated. In one embodiment, when edge enhancement is performed, regardless of which signal level the signal is transitioning from and which signal level the signal is transitioning to, the signal may reach the corresponding threshold voltage at the same point in time relative to when the corresponding transition was initiated.

As illustrated in eye diagram 250, the signal transitions from signal levels 232, 234, and 236 to signal level 230 all reach the threshold voltage 240 at approximately the same point in time (i.e., time 262). In one embodiment, time 262 is approximately equal to time 212 in eye diagram 200 when the transition from signal level 232 to signal level 230 reaches the threshold voltage 240. This indicates that the slew rate for the transition from signal level 232 to signal level 230 was left unchanged, while the slew rate for the transition from signal level 234 to signal level 230, and the slew rate for the transition from signal level 236 to signal level 230 were both increased. As a result, the width of eye 202 in eye diagram 250 spans from time 262 to time 264. As can be seen, the width of eye 202 in eye diagram 250 is considerably larger than in eye diagram 200, and is much closer to the symbol width (defined by the interval between time 210 and time 220.) In another embodiment, time 262 may occur after time 212, such as between time 212 and 214. This indicates that the slew rate for the transition from signal level 232 to signal level 230 was decreased, while the slew rate for the transition from signal level 234 to signal level 230, and the slew rate for the transition from signal level 236 to signal level 230 were both increased. In other embodiments, time 262 may occur approximately equal to time 214, or between times 214 and 216.

Although FIGS. 2A and 2B illustrate transitions to signal level 230 from each of signal levels 232, 234, and 236, it should be understood that transitions to any signal level from any other signal level are possible. Such transitions would occur in the same manner as described herein and other corresponding threshold voltages may be used. For example, the slew rates of these transitions may be controlled in order to cause the signal to reach threshold voltages between signal levels 232 and 234 or between signal levels 234 and 236 at certain points in time after the corresponding transitions are initiated.

In one embodiment, as shown in eye diagram 270 of FIG. 2C for example, slew rate control circuit 116 can control at least one parameter of the signal transmitter circuit, such as an output impedance of the output driver 110 or an amount of current injected into the signal, to adjust the slew rate during certain transitions but not during others. As illustrated in eye diagram 270, the signal transitions from signal level 232 to signal level 230 reaches the threshold voltage 240 at time 272. In one embodiment, time 272 may be the original time based on a natural or default slew rate that is not adjusted by slew rate control circuit 116. The signal transitions from signal levels 234 and 236 to signal level 230 both reach the threshold voltage 240 at approximately the same point in time (i.e., time 274). In one embodiment, time 274 is approximately equal to time 214 in eye diagram 200 when the transition from signal level 234 to signal level 230 reaches the threshold voltage 240. This indicates that the slew rate for the transition from signal level 234 to signal level 230 was left unchanged, while the slew rate for the transition from signal level 236 to signal level 230 was increased. As a result, the width of eye 202 in eye diagram 250 spans from time 274 to time 276. As can be seen, the width of eye 202 in eye diagram 270 is also larger than in eye diagram 200, and is much closer to the symbol width (defined by the interval between time 210 and time 220.) Thus, depending on the embodiment, the slew rate may be adjusted for one or more signal transitions while being maintained at a natural, default, or previous level for other transitions in order to cause the signal to reach a threshold voltage at a particular desired time after a corresponding transition is initiated.

Figure 3A:
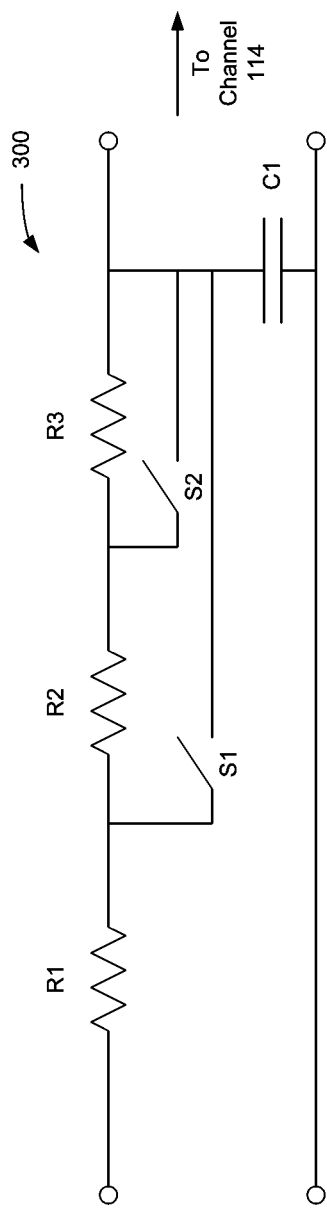
FIGS. 3A and 3B are block diagrams illustrating circuitry for controlling an output impedance of a signal transmitter circuit for use in edge enhancement, according to an embodiment.
Figure 3B:
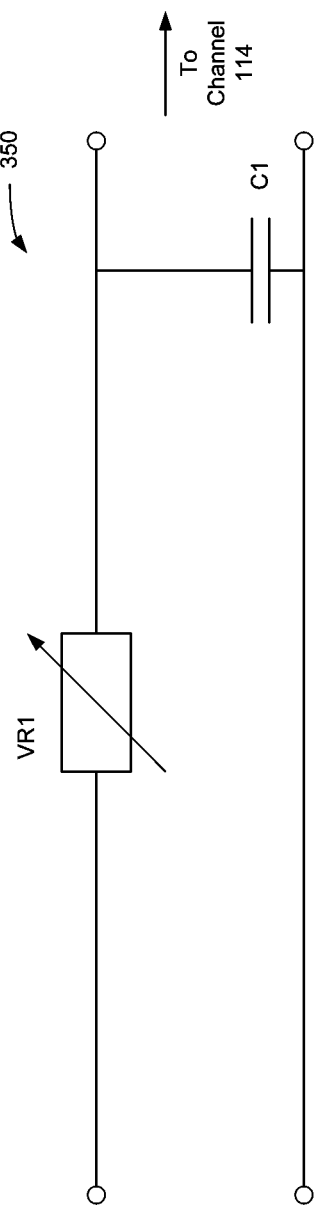

FIGS. 3A and 3B are block diagrams illustrating circuitry for controlling an output impedance of a signal transmitter circuit for use in edge enhancement, according to an embodiment. As described above, in one embodiment, slew rate control circuit 116 can adjust the output impedance of the signal transmitter during the relevant transition periods in order to control the slew rate. The desired output impedance is determined in order to improve the eye width (e.g., timing margin) of a 4-PAM transmitter output by using different slew rates for different transitions. In one embodiment, slew rate control circuit 116 controls a number of switches S1 and S2 in a resistor switch network 300, as shown in FIG. 3A. Resistor switch network 300 may be part of output driver 110 or another component of the signal transmitter circuit, and may include resistors R1, R2, and R3, as well as capacitor C1. When neither of switch S1 or S2 are closed, the output impedance of resistor switch network 300 is provided by resistors R1, R2, and R3 in series. When switch S2 is closed, the output impedance of resistor switch network 300 is provided by resistors R1 and R2 in series. When switch S1 is closed, the output impedance of resistor switch network 300 is provided by resistor R1. Accordingly, slew rate control circuit 116 can adjust the output impedance as needed to control the slew rate for a particular transition. In other embodiments, resistor switch network 300 can include any other number and/or arrangement of resistors, inductors, capacitors, switches, or other components. In another embodiment, slew rate control circuit 116 controls a variable resistor VR1 in circuit 350, as shown in FIG. 3B. Circuit 350 may be part of output driver 110 or another component of the signal transmitter circuit, and may include variable resistor VR1, as well as capacitor C1. Slew rate control circuit 116 can adjust the output impedance provided by variable resistor VR1 as needed to control the slew rate for a particular transition.

For the transition from signal level 236 (e.g., −3 V) to signal level 230 (e.g., +3 V), the signal v(t) can be modeled as a function of time t and the time constant τ1 as shown in Equation 1, where the time constant τ1 is equal to the output impedance of the transmitter, as adjusted, multiplied by the capacitance, which is generally fixed.

$$v(t) = 3 - 6e^{-\frac{t}{\tau 1}} = 2 \tag{1}$$

As a result, the time constant τ1 for this transition can be expressed as shown in Equation 2.

$$\frac{t}{\tau 1} = \ln(6) \tag{2}$$

For the transition from signal level 234 (e.g., −1 V) to signal level 230 (e.g., +3 V), the signal v(t) can be modeled as a function of time t and the time constant τ2 as shown in Equation 3, where the time constant τ2 is equal to the output impedance of the transmitter, as adjusted, multiplied by the capacitance, which is generally fixed.

$$v(t) = 3 - 4e^{-\frac{t}{\tau 2}} = 2 \tag{3}$$

As a result, the time constant τ2 for this transition can be expressed as shown in Equation 4.

$$\frac{t}{\tau 2} = \ln(4) \tag{4}$$

For the transition from signal level 232 (e.g., +1 V) to signal level 230 (e.g., +3 V), the signal v(t) can be modeled as a function of time t and the time constant τ3 as shown in Equation 5, where the time constant τ3 is equal to the output impedance of the transmitter, as adjusted, multiplied by the capacitance, which is generally fixed.

$$v(t) = 3 - 2e^{-\frac{t}{\tau 3}} = 2 \tag{5}$$

As a result, the time constant τ3 for this transition can be expressed as shown in Equation 6.

$$\frac{t}{\tau 3} = \ln(2) \tag{6}$$

With these calculated values for the time constant, a ratio between the time constants for each transition can be determined, as shown in Equations 7 and 8.

$$\frac{\tau 3}{\tau 2} = \frac{\ln(4)}{\ln(2)} = 2 \tag{7}$$

$$\frac{\tau 2}{\tau 1} = \frac{\ln(6)}{\ln(4)} = 1.29 \tag{8}$$

Thus, the time constant τ3 for the transition from signal level 232 (e.g., +1 V) to signal level 230 (e.g., +3 V) should be twice as large as the time constant τ2 for the transition from signal level 234 (e.g., −1 V) to signal level 230 (e.g., +3 V), and the time constant τ2 should be approximately 1.29 times as large as the time constant τ1 for the transition from signal level 236 (e.g., −3 V) to signal level 230 (e.g., +3 V). Since the capacitance generally remains unchanged, these ratios of the time constants also represent the approximate ratios of the output impedances for each transition. Accordingly, slew rate control circuit 116 can set or determine a value of the output impedance for any one of the transitions, determine the relative values for the other transitions according to the ratios above in Equations 7 and 8, and set the corresponding output impedance using one of resistor switch network 300, as shown in FIG. 3A, or the variable resistor in circuit 350, as shown in FIG. 3B.

Figure 4:
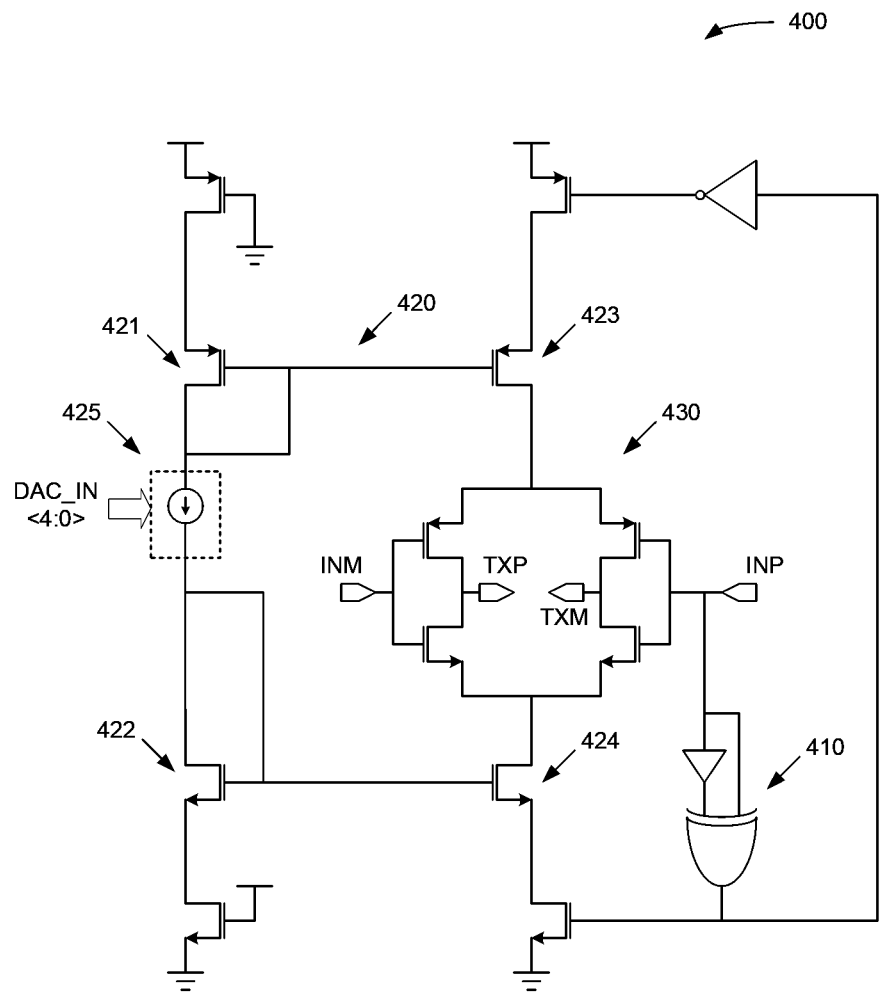
FIG. 4 is a block diagram illustrating a circuit for controlling an amount of current with which a signal is transmitted for use in edge enhancement, according to an embodiment.

FIG. 4 is a block diagram illustrating a circuit 400 for controlling an amount of current with which a signal is transmitted for use in edge enhancement, according to an embodiment. Circuit 400 may be part of output driver 110 or another component of the signal transmitter circuit, and may include a transition detector 410, an H-bridge driver 420 with a current source 425, and circuit 430. In response to transition detector 410 detecting a transition in the input signals INM and INP, the H-bridge driver 420 can control the current source 425 in order to influence the slew rate of the output signals TXP and TXM during the detected transition. In one embodiment, the H-bridge driver 420 is built with four transistors 421, 422, 423, and 424 acting as current mirrors. Depending on the activation status of the current mirrors, the amount of current provided by current source 425 and mirrored to circuit 430 for application to the output signals TXP and TXM can be varied as needed. For example, as illustrated in FIG. 4, current source 425 may be implemented as a current digital-to-analog converter (DAC). In one embodiment the current DAC may have a 5-bit input value that controls the amount of current generated by current source 425 and provided to the current mirror in circuit 400. In other embodiments, the current DAC may have a different input value (e.g., 3 bits or 8 bits). In one embodiment, the desired amount of current is determined in order improve the eye width (e.g., timing margin) of a 4-PAM transmitter output by using different slew rates for different transitions. In other embodiments, circuit 400 may include multiple H-bridge driver circuits (e.g., multiple copies of H-bridge driver 420) to drive circuit 430. When multiple H-bridge driver circuits are present, each copy may be enabled by separate control signals in order to vary the slew rates for different signal transitions.

For the transition from signal level 236 (e.g., −3 V) to signal level 230 (e.g., +3 V), the signal v(t) can be modeled as a function of time t, the time constant τ1, and the amount of injected current as adjusted, as shown in Equation 9, where the time constant τ1 is equal to the output impedance of the transmitter multiplied by the capacitance, where $Z_L$ is the load impedance.

$$v(t) = 3 - 6e^{-\frac{t}{\tau 1}} + I_{inj1} \cdot Z_L = 2 \tag{9}$$

For the transition from signal level 234 (e.g., −1 V) to signal level 230 (e.g., +3 V), the signal v(t) can be modeled as a function of time t, the time constant τ1, and the amount of injected current as adjusted, as shown in Equation 10, where the time constant τ1 is equal to the output impedance of the transmitter multiplied by the capacitance.

$$v(t) = 3 - 4e^{-\frac{t}{\tau 1}} + I_{inj2} \cdot Z_L = 2 \tag{10}$$

For the transition from signal level 232 (e.g., +1 V) to signal level 230 (e.g., +3 V), the signal v(t) can be modeled as a function of time t, the time constant τ1, and the amount of injected current as adjusted, as shown in Equation 11, where the time constant τ1 is equal to the output impedance of the transmitter multiplied by the capacitance.

$$v(t) = 3 - 2e^{-\frac{t}{\tau 1}} + I_{inj3} \cdot Z_L = 2 \tag{11}$$

As a result, amounts of current for each transition can be expressed relative to one another as shown in Equations 12 and 13 and a ratio of the amounts of current is shown in Equation 14.

$$I_{inj1} = 0.5 + 1.5 I_{inj2} \tag{12}$$

$$I_{inj3}*2+1=I_{inj2} \quad (13)$$

$$I_{inj3}:I_{inj2}:I_{inj1}=0:1:2 \quad (14)$$

Thus, if no additional current $I_{inj3}$ is injected during the transition from signal level 232 (e.g., +1 V) to signal level 230 (e.g., +3 V), one unit of current $I_{inj2}$ can be injected during the transition from signal level 234 (e.g., −1 V) to signal level 230 (e.g., +3 V), and two units of current $I_{inj1}$ injected during the transition from signal level 236 (e.g., −3 V) to signal level 230 (e.g., +3 V). Accordingly, slew rate control circuit 116 can set or determine a value of the unit of current for any one of the transitions, determine the relative values for the other transitions according to the ratios above in Equation 14, and set the corresponding amount of current to be injected using the H-bridge driver 420 and current source 425, of circuit 400, as shown in FIG. 4.

Figure 5:
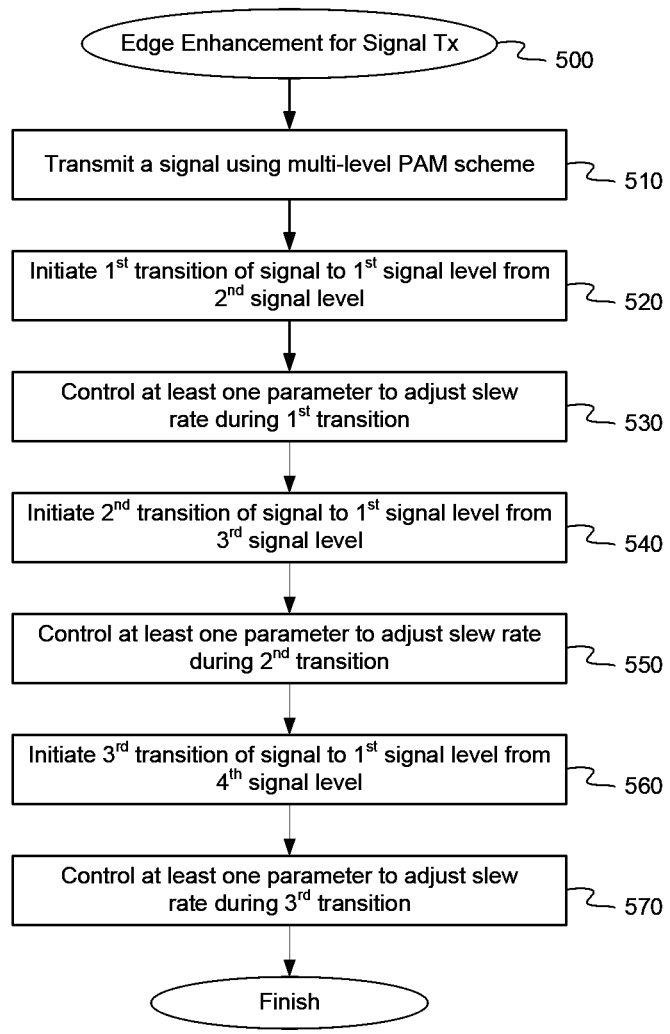
FIG. 5 is a flow diagram illustrating a method of edge enhancement for a signal transmitter, according to an embodiment.

FIG. 5 is a flow diagram illustrating a method of edge enhancement for a signal transmitter, according to an embodiment. The method 500 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 500 is performed by a signal transmitter circuit including slew rate control circuit 116, as shown in FIG. 1.

Referring to FIG. 5, at block 510, method 500 transmits a signal using a multi-level PAM scheme comprising a plurality of discreet signal levels. In one embodiment, an output driver 110 of a signal transmitter circuit drives the signal (e.g., a data signal, command signal, etc.) onto a channel 114. The multi-level PAM scheme may include, for example, 4-PAM where two bit data values are encoded via one of four discreet signal levels. In one embodiment, output driver 110 transmits the signal from one printed circuit board 106 to a receiver 120 on another printed circuit board 108. In other embodiments, output driver 110 may transmit the signal to a receiver located on the same printed circuit board or elsewhere.

At block 520, method 500 initiates a first transition of the signal to a first level of the multi-level PAM scheme from a second level of the multi-level PAM scheme. In order to convey a different value, output driver 110 periodically transitions the signal from one signal level to another. For example, the signal illustrated in eye diagram 250 of FIG. 2B may transition from signal level 232 to signal level 230. Due to the voltage difference between signal level 232 and signal level 230, a slew rate associated with the transition affects how long it takes the first transition to occur. The slew rate represents the rate of change of the signal from signal level 232 to signal level 230 over time.

At block 530, method 500 controls at least one parameter of the signal transmitter circuit to adjust the slew rate of the signal during the first transition to cause the signal to reach a threshold voltage level at a first time, the first time occurring a first duration of time after the first transition is initiated. In one embodiment, slew rate control circuit 116 controls an output impedance of the signal transmitter circuit in order to adjust the slew rate. In general, as slew rate control circuit 116 increases the output impedance during the first transition, the first slew rate decreases. In another embodiment, slew rate control circuit 116 controls an amount of current with which the signal is transmitted during the first transition in order to adjust the slew rate. In general, as slew rate control circuit 116 increases the amount of current during the first transition, the slew rate also increases. Thus, when transitioning from signal level 232 to signal level 230, the signal will reach the threshold voltage level 240 earlier than if the output impedance was higher or if the amount of current was lower. In one embodiment, slew rate control circuit 116 maintains the previous or a default output impedance and amount of current such that the slew rate remains unchanged during the first transition.

At block 540, method 500 initiates a second transition of the signal to the first level from a third level of the multi-level PAM scheme. For example, the signal illustrated in eye diagram 250 of FIG. 2B may transition from signal level 234 to signal level 230. Due to the voltage difference between signal level 234 and signal level 230, there is an associated slew rate associated with the transition which affects how long it takes the second transition to occur. The slew rate represents the rate of change of the signal from signal level 234 to signal level 230 over time, and may be the same or different than the slew rate during the first transition, depending on the embodiment.

At block 550, method 500 controls the at least one parameter of the signal transmitter to adjust the slew rate of the signal during the second transition to cause the signal to reach the threshold voltage level at a second time, the second occurring the first duration of time after the second transition is initiated. In one embodiment, slew rate control circuit 116 controls a parameter in order to adjust the slew rate to cause the signal to reach the threshold voltage the same amount of time after the second transition is initiated as when the signal reaches the threshold voltage during the first transition. For example, the period of time may be the difference between time 210 and time 262, as illustrated in eye diagram 250 of FIG. 2B. Since the first and second transitions are occurring at different times, the signal does reach the threshold voltage level 240 at the same actual time, but instead reaches the threshold voltage level 240 at the same time relative to when the corresponding first transition was initiated. In other words, the same period of time passes between when the first transition is initiated and when the signal reaches the threshold voltage level 240 as between when the second transition is initiated and when the signal reaches the threshold voltage level 240. Depending on the embodiment, slew rate control circuit 116 may control either the output impedance or the amount of current used during the second transition. The parameter that is controlled (i.e., output impedance or current) to adjust the slew rate during the second transition may be the same one or a different one as was controlled to adjust the slew rate during the first transition. Thus, when transitioning from signal level 234 to signal level 230, the signal will reach the threshold voltage level 240 earlier than if the output impedance was higher or if the amount of current was lower. For example, the signal may reach threshold voltage level 240 at time 262 instead of time 214. In one embodiment, slew rate control circuit 116 maintains the previous or a default output impedance and amount of current such that the slew rate remains unchanged during the second transition.

At block 560, method 500 initiates a third transition of the signal to the first level from a fourth level of the multi-level PAM scheme. For example, the signal illustrated in eye diagram 250 of FIG. 2B may transition from signal level 236 to signal level 230. Due to the voltage difference between signal level 236 and signal level 230, there is a slew rate associated with the transition which affects how long it takes the third transition to occur. The slew rate represents the rate of change of the signal from signal level 236 to signal level 230 over time, and may be the same or different than the slew rate during the first and second transitions, depending on the embodiment.

At block 570, method 500 controls the at least one parameter of the signal transmitter circuit to adjust the slew rate of the signal during the third transition to cause the signal to reach the threshold voltage level at a third time, the third time occurring the first duration of time after the third transition is initiated. In one embodiment, slew rate control circuit 116 controls a parameter in order to adjust the slew rate to cause the signal to reach the threshold voltage the same amount of time after the third transition is initiated as when the signal reaches the threshold voltage during the first and second transitions. For example, the period of time may be the difference between time 210 and time 262, as illustrated in eye diagram 250 of FIG. 2B. Depending on the embodiment, slew rate control circuit 116 may control either the output impedance or the amount of current used during the third transition. The parameter that is controlled (i.e., output impedance or current) to adjust the slew rate during the third transition may be the same one or a different one as was controlled to adjust the slew rate during the first and second transitions. Thus, when transitioning from signal level 236 to signal level 230, the signal will reach the threshold voltage level 240 earlier than if the output impedance was higher or if the amount of current was lower. For example, the signal may reach threshold voltage level 240 at time 262 instead of time 216.

Figure 6:
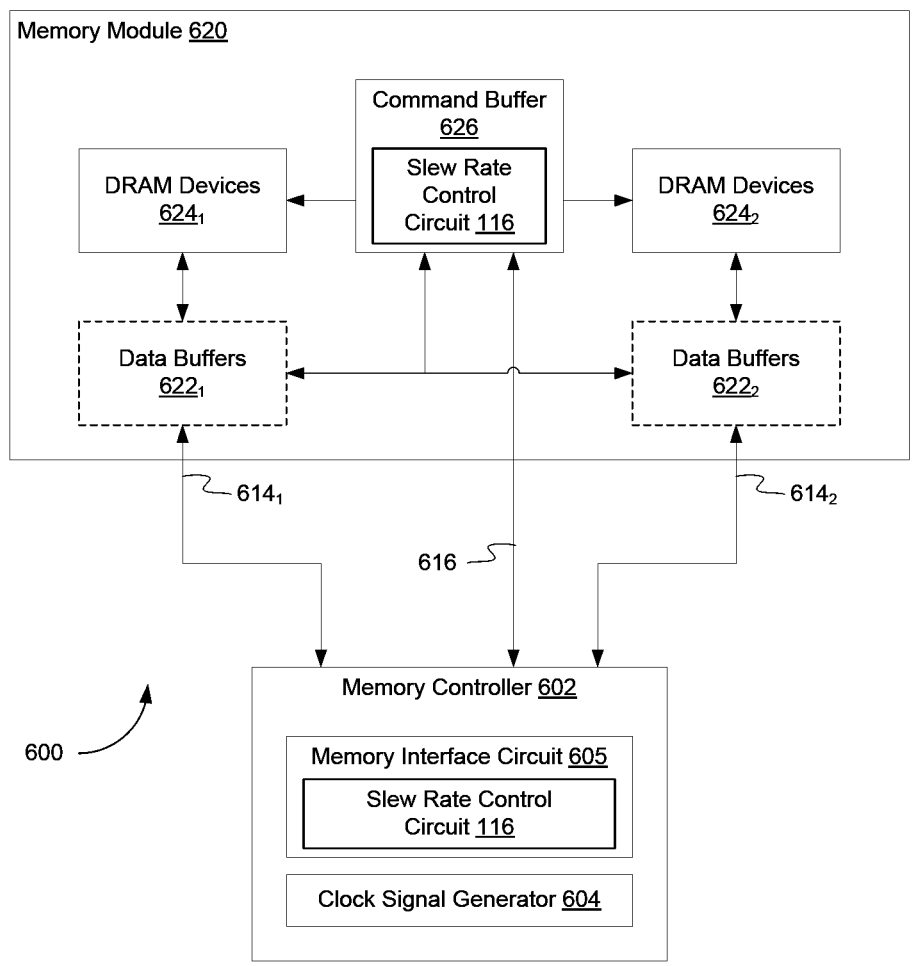
FIG. 6 is a block diagram illustrating a computing environment with a memory controller configured to use edge enhancement when transmitting signals to a memory system, according to an embodiment.

FIG. 6 depicts an environment 600 showing a memory module 620. As an option, one or more instances of environment 600 or any aspect thereof may be implemented in the context of the architecture and functionality of the embodiments described herein.

As shown in FIG. 6, environment 600 comprises a memory controller 602 coupled to a memory module 620. In one embodiment, memory module 620 is a dual in-line memory module (DIMM). Such memory modules can be referred to as DRAM DIMMs, registered DIMMs (RDIMMs), or load-reduced DIMMs (LRDIMMs), and can share a memory channel with other DRAM DIMMs.

In on embodiment, the memory controller 602 further comprises a clock signal generator 604, and a memory interface circuit 605, which may include a signal transmitter circuit and an instance of slew rate control circuit 116. Memory controller 602 can comprise multiple instances each of clock signal generator 604 and memory interface circuit 605. The memory controller 602 can further include a cache memory, which can be dedicated to a single processing core or shared with other cores. Clock signal generator 604 may include a phase lock loop (PLL) or other circuit to generate one or more clock signals. In other embodiments, clock signal generator 604 may receive one or more clock signals from a source external to the memory controller 602. In either embodiment, memory interface circuit 605 may include a driver to drive the one or more clock signals from clock signal generator 604 off of memory controller 602 (e.g., to components such as RCD or Buffer chips on memory module 620).

The memory interface circuit 605 of the memory controller 602 communicates with the memory module 620 using a physical interface (e.g., to communicate with DRAM devices compliant with the JEDEC standard, etc.) over which data and command signals may be sent. These data and command signals can be adjusted by slew rate control circuit 116 to align the transitions between signal levels in the manner described above. Depending on the embodiment, various communication protocols may be used such as peripheral component interconnect express (PCIe), Gen-Z, cache coherent interconnect for accelerators (CCIX), and open coherent accelerator processor interface (OpenCAPI). Specifically, the memory interface circuit 605 can write data to and/or read data from multiple sets of DRAM devices $624_1$-$624_2$ using a data bus $614_1$ and a data bus $614_2$, respectively. For example, the data bus $614_1$ and the data bus $614_2$ can transmit the data as electronic signals such as a data signal, a chip select signal, and/or a data strobe signal. In one embodiment, data bus $614_1$ and data bus $614_2$ can each include two or more groups of multiple data signals (e.g., four data signals per group), with each group having a corresponding strobe signal or signals, generated by clock signal generator 604. Memory interface circuit 605 then transmits the data signals together with the strobe signals to memory module 620 over either data bus $614_1$ or data bus $614_2$.

The DRAM devices $624_1$-$624_2$ in memory module 620 can each comprise an array of eight or nine memory devices (e.g., SDRAM) arranged in various topologies (e.g., A/B sides, single-rank, dual-rank, quad-rank, etc.). In some cases, as shown, the data to and/or from the DRAM devices $624_1$-$624_2$ can optionally be buffered by a set of data buffers $622_1$ and data buffers $622_2$, respectively. Such data buffers can serve to redrive the signals (e.g., data or DQ signals, etc.) to help mitigate high electrical loads of large computing and/or memory systems. In other embodiments, data buffers $622_1$ and data buffers $622_2$ are not present in memory module 620.

Further, command/address signals from the memory interface circuit 605 can be received by a command buffer 626, such as a register clock driver (RCD), at the memory module 620 using a command and address (CA) bus 616. For example, the command buffer 626 might be an RCD such as included in registered DIMMs (e.g., RDIMMs, LRDIMMs, etc.). Command buffers such as command buffer 626 can comprise a logical register and a phase-lock loop (PLL) to receive and re-drive command and address input signals from the memory controller 602 to the DRAM devices on a DIMM (e.g., DRAM devices $624_1$, DRAM devices $624_2$, etc.), reducing clock, control, command, and address signal loading by isolating the DRAM devices from the memory controller 602. In some cases, certain features of the command buffer 626 can be programmed with configuration and/or control settings. In one embodiment, command buffer 626 receives a number of command/address signals together with at least one clock signal from memory controller 602 via CA bus 616. In one embodiment, command buffer 626 includes an instance of slew rate control circuit 116 to control the slew rate of signal transmitted to DRAM devices $624_1$-$624_2$.

The memory module 620 shown in environment 600 presents merely one partitioning. In other embodiments, in addition or in the alternative, memory module 620 may include other volatile memory devices, such as synchronous DRAM (SDRAM), Rambus DRAM (RDRAM), static random access memory (SRAM), etc. The specific example shown where the command buffer 626 and the DRAM devices $624_1$-$624_2$ are separate components is purely exemplary, and other partitioning is possible. For example, any or all of the components comprising the memory module 620 and/or other components can comprise one device (e.g., system-on-chip or SoC), multiple devices in a single package or printed circuit board, multiple separate devices, and can have other variations, modifications, and alternatives. In addition, memory controller 602 may include additional and/or different components than those illustrated in FIG. 6.

Furthermore, the illustrated components may be arranged differently depending on the embodiment.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "setting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any procedure for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

What is claimed is:

1. A signal transmitter circuit comprising:
    an output driver circuit configured to transmit a signal using a multi-level pulse amplitude modulation (PAM) scheme comprising a plurality of discreet signal levels and initiate a plurality of transitions of the signal between levels of the multi-level PAM scheme;
    a control circuit coupled to the output driver circuit, the control circuit configured to, during at least a subset of the plurality of transitions, control a slew rate of the signal transmitter circuit to cause the signal to reach a threshold voltage level at a given time after each respective transition in the subset is initiated.

2. The signal transmitter circuit of claim 1, wherein the plurality of transitions comprises a first transition of the signal to a first level of the multi-level PAM scheme from a second level of the multi-level PAM scheme and a second transition of the signal to the first level from a third level of the multi-level PAM scheme.

3. The signal transmitter circuit of claim 2 wherein the second level has a lower voltage than the first level, wherein the third level has a lower voltage than the second level, and wherein the threshold level has a voltage between the first level and the second level.

4. The signal transmitter circuit of claim 2 wherein controlling the slew rate of the signal transmitter circuit comprises causing the signal to reach the threshold voltage level at a first time occurring a first duration of time after the first transition is initiated and to reach the threshold voltage at a second time occurring the first duration of time after the second transition is initiated.

5. The signal transmitter circuit of claim 1, wherein to control the slew rate of the signal transmitter circuit, the control circuit is configured to control at least one parameter of the signal transmitter circuit to adjust the slew rate during a transition of the signal.

6. The signal transmitter circuit of claim 5, wherein to control the at least one parameter of the signal transmitter circuit, the control circuit is configured to control an output impedance of the signal transmitter circuit, wherein the slew rate increases as the output impedance decreases.

7. The signal transmitter circuit of claim 5, wherein to control the at least one parameter of the signal transmitter circuit, the control circuit is configured to control an amount of injected current during at least one of the plurality of transitions, wherein the slew rate increases as the amount of current increases.

8. A method comprising:
transmitting, by a signal transmitter circuit, a signal using a multi-level pulse amplitude modulation (PAM) scheme comprising a plurality of discreet signal levels;
initiating a plurality of transitions of the signal between levels of the multi-level PAM scheme; and
during at least a subset of the plurality of transitions, controlling a slew rate of the signal transmitter circuit to cause the signal to reach a threshold voltage level at a given time after each respective transition in the subset is initiated.

9. The method of claim 8, wherein the plurality of transitions comprises a first transition of the signal to a first level of the multi-level PAM scheme from a second level of the multi-level PAM scheme and a second transition of the signal to the first level from a third level of the multi-level PAM scheme.

10. The method of claim 9, wherein the second level has a lower voltage than the first level, wherein the third level has a lower voltage than the second level, and wherein the threshold level has a voltage between the first level and the second level.

11. The method of claim 9, wherein controlling the slew rate of the signal transmitter circuit comprises causing the signal to reach the threshold voltage level at a first time occurring a first duration of time after the first transition is initiated and to reach the threshold voltage level at a second time occurring the first duration of time after the second transition is initiated.

12. The method of claim 8, wherein controlling the slew rate of the signal transmitter circuit comprises controlling at least one parameter of the signal transmitter circuit to adjust the slew rate during a transition of the signal.

13. The method of claim 12, wherein controlling the at least one parameter of the signal transmitter circuit comprises controlling an output impedance of the signal transmitter circuit, wherein the slew rate increases as the output impedance decreases.

14. The method of claim 12, wherein controlling the at least one parameter of the signal transmitter circuit comprises controlling an amount of current with which the signal is transmitted during at least one of the plurality of transitions, wherein the slew rate increases as the amount of current increases.

15. An integrated circuit comprising:
a signal generator circuit; and
a signal transmitter circuit coupled to the signal generator circuit, the signal transmitter circuit comprising:
an output driver circuit configured to transmit a signal using a multi-level pulse amplitude modulation (PAM) scheme comprising a plurality of discreet signal levels and initiate a plurality of transitions of the signal between levels of the multi-level PAM scheme;
a control circuit coupled to the output driver circuit, the control circuit configured to, during at least a subset of the plurality of transitions, control a slew rate of the signal transmitter circuit to cause the signal to reach a threshold voltage level at a given time after each respective transition in the subset is initiated.

16. The integrated circuit of claim 15, wherein the plurality of transitions comprises a first transition of the signal to a first level of the multi-level PAM scheme from a second level of the multi-level PAM scheme and a second transition of the signal to the first level from a third level of the multi-level PAM scheme.

17. The integrated circuit of claim 16, wherein the second level has a lower voltage than the first level, wherein the third level has a lower voltage than the second level, and wherein the threshold level has a voltage between the first level and the second level.

18. The integrated circuit of claim 15, wherein controlling the slew rate of the signal transmitter circuit comprises causing the signal to reach the threshold voltage level at a first time occurring a first duration of time after the first transition is initiated and to reach the threshold voltage level at a second time occurring the first duration of time after the second transition is initiated.

19. The integrated circuit of claim 15, wherein to control the slew rate of the signal transmitter circuit, the control circuit is configured to control at least one parameter of the signal transmitter circuit to adjust the slew rate during a transition of the signal.

20. The integrated circuit of claim 19, wherein to control the at least one parameter of the signal transmitter circuit, the control circuit is configured to control at least one of an output impedance of the signal transmitter circuit or an amount of current with which the signal is transmitted during at least one of the plurality of transitions, wherein the slew rate increases as at least one of the output impedance decreases or the amount of current increases.

* * * * *